US012619609B1

(12) United States Patent    (10) Patent No.: US 12,619,609 B1

Martinez et al.    (45) Date of Patent:    *May 5, 2026

(54) AUTOMATIC QUERYING THROUGH SELECTION OF REGISTERED DATA SETS

(71) Applicant: United Services Automobile Association (USAA), San Antonio, TX (US)

(72) Inventors: Matthew James Martinez, San Antonio, TX (US); Joseph James Albert Campbell, New Braunfels, TX (US); Quentin L. Holness, San Antonio, TX (US); Ryan Matthew West, Helotes, TX (US); Rachel Michelle Ballew, San Antonio, TX (US); Mitchell Wade Palermo, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/026,168

(22) Filed: Jan. 16, 2025

Related U.S. Application Data

(63) Continuation of application No. 17/877,784, filed on Jul. 29, 2022, now Pat. No. 12,242,480.

(60) Provisional application No. 63/227,524, filed on Jul. 30, 2021.

(51) Int. Cl.
   *G06F 16/242*    (2019.01)
   *G06F 16/2453*    (2019.01)

(52) U.S. Cl.
   CPC .... *G06F 16/24544* (2019.01); *G06F 16/2423* (2019.01); *G06F 16/2428* (2019.01)

(58) Field of Classification Search
CPC .... G06F 16/24; G06F 16/242; G06F 16/2423; G06F 16/2428; G06F 16/2453; G06F 16/24542; G06F 16/24544
See application file for complete search history.

(56) References Cited

U.S. PATENT DOCUMENTS

| | | |
|---|---|---|
| 2007/0033159 A1 | 2/2007 | Cherkauer |
| 2016/0048565 A1 | 2/2016 | Cammert et al. |
| | (Continued) | |

OTHER PUBLICATIONS

U.S. Appl. No. 17/877,784, filed Jul. 29, 2022, Automatic Querying Through Selection of Registered Data Sets.

*Primary Examiner* — Tony Mahmoudi
*Assistant Examiner* — Nirav K Khakhar
(74) *Attorney, Agent, or Firm* — Perkins Coie LLP

(57) ABSTRACT

Methods and systems described herein are directed to creating customized queries on data sets via selection of search elements based on meta-data from data set registrations. In some implementations, an automatic query system can register database elements with associated meta-data by receiving programming data objects, corresponding to database elements, with meta-data and adding the programming objects as selectable values for a user interface (UI). Each data object can define one or more elements for a table and/or column(s) within a table in a database. The automatic query system can provide the UI to a user to receive table and column selections. The automatic query system can select a root table to join the selected tables into, and generate a join query for the root table by inserting search string snippets, corresponding to selected tables and columns, into a query template.

20 Claims, 10 Drawing Sheets

(56)        References Cited

U.S. PATENT DOCUMENTS

2021/0397619 A1    12/2021  Heimel et al.
2022/0414092 A1    12/2022  Carter et al.

400 start

402 receive programming data objects

404 add programming objects as selectable elements for UI end

| Operator.DriverLicenseType | AutoPolicy.ContactChannel | AutoPolicy.PolicyDate |
|---|---|---|
| Regular | Phone | 2008-01-13 |
| Commercial | NULL | 2008-02-14 |
| Regular | Email | 2008-03-15 |
| Commercial | NULL | 2008-01-16 |
| Regular | Phone | 2008-01-17 |
| Motorcycle | Mail | 2008-01-18 |

AUTOMATIC QUERYING THROUGH SELECTION OF REGISTERED DATA SETS

CROSS-REFERENCE TO RELATED APPLICATIONS

This application is a continuation of U.S. patent application Ser. No. 17/877,784, filed on Jul. 29, 2022, now allowed, entitled "AUTOMATIC QUERYING THROUGH SELECTION OF REGISTERED DATA SETS," which claims priority to U.S. Provisional Application No. 63/227, 524, filed on Jul. 30, 2021, entitled "AUTOMATIC QUERYING THROUGH SELECTION OF REGISTERED DATA SETS," both of which are hereby incorporated by reference in its entirety for all purposes.

TECHNICAL FIELD

The present disclosure is directed to creating customized queries on data sets via selection of search elements based on meta-data from data set registration.

BACKGROUND

When analysts build a search query, they have to identify data sources, such as which tables to search and which columns to use. However, these data sources are often cryptically formatted. Furthermore, background knowledge for them is often only available in unstructured institutional knowledge, which the analysis must exhaustively search such as by asking teammates or subject matter experts, looking through often outdated comments or company manuals, and applying inefficient trial and error techniques. However, such analysis is inefficient and inaccurate for locating data that is stored in various tables and under a variety of labels.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
FIG. 1 is a block diagram illustrating an overview of devices on which some implementations can operate.
Figure 1:
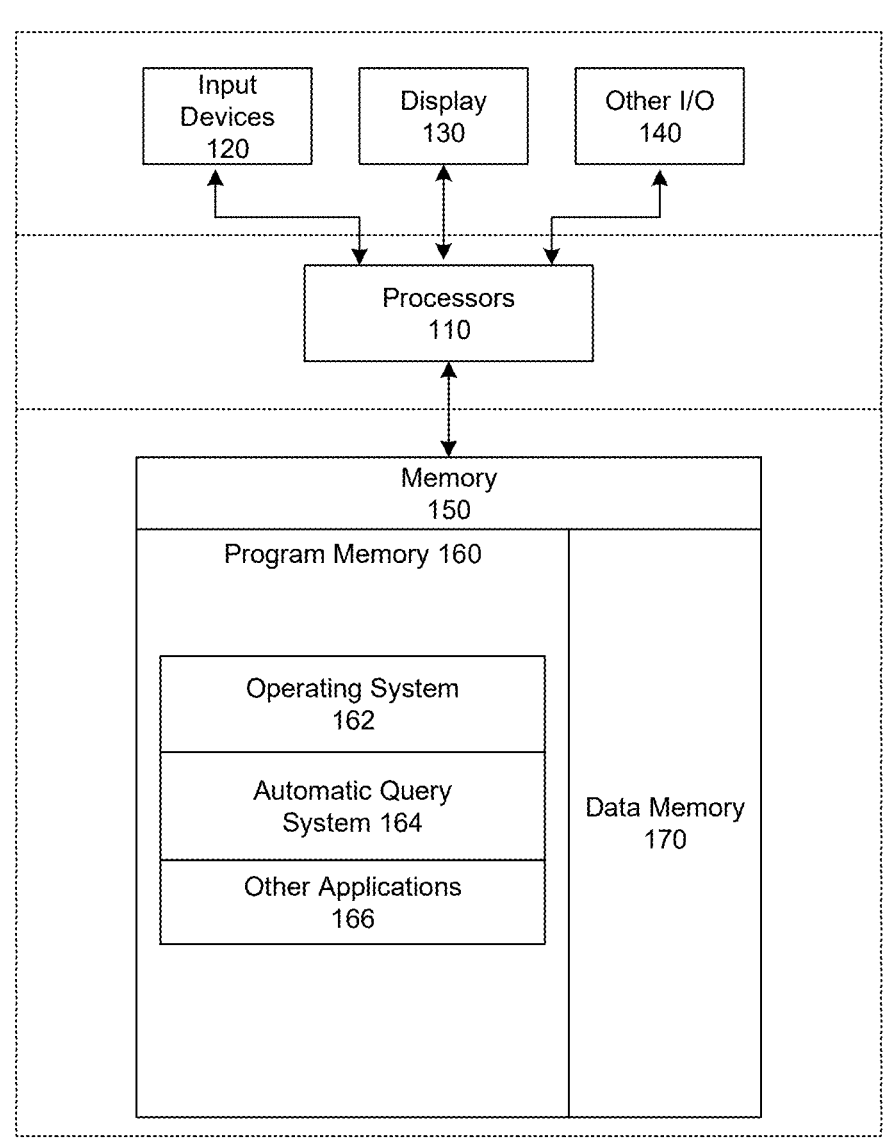

Aspects of the present disclosure are directed to executing customized queries created from user selections, of query elements, that are based on meta-data from data set registrations. Currently, analysts often must rely on informal, unorganized, or cryptic institutional data sources (e.g., their knowledge, knowledge of teammates or subject matter experts, non-uniform and ambiguous data labels, manuals or comments, etc.), to build a search query of data located in multiple tables or databases. However, relying on such esoteric sources to build a search query is an inefficient and inaccurate process to locate data that is stored in various tables and under a variety of labels. Analysts unfamiliar with data labels or data storage processes of a company can waste time and resources building a search query and may require months of training to be able to effectively build such queries. Thus, an automatic query system is needed to retrieve data from a variety of tables in a database(s) and provide the results to the user. The automatic query system described herein can allow a user to filter and select tables, columns, and values of data in a database, using meta-data assigned to those database elements, and execute a join query without the user needing detailed knowledge of the underlying data tables.

In some implementations, the automatic query system can register database elements with associated meta-data by receiving programming data objects, corresponding to database elements, with meta-data and adding the programming objects as selectable values for a user interface (UI). Each data object can define one or more elements for a table and/or column(s) within a table in a database. The corresponding meta-data can define 1) what is shown in the UI for that table/column selection and 2) how the tables/columns can be searched/filtered. The automatic query system can add the programming objects as selectable values for the UI by adding the tables as selectable elements for the UI and adding columns as selectable elements where the corresponding table has been selected. Additional details on registering database elements with meta-data are provided below in relation to FIG. 4.

In some implementations, the automatic query system can provide the UI to a user to receive table, column, and value filter selections. The items in each table/column list can be based on the meta-data, from the programming data object, defining that element. As the user makes table selections, the automatic query system can filter the list of selectable tables so that the additional tables, that can be joined to the previously selected tables, are available for user selection. For example, the available tables can be filtered based on each available table having at least one column in common with the previously selected tables. After the user selects one or more tables, the automatic query system can retrieve the columns corresponding to the selected tables. The automatic query system can receive the column selections of the user and filter the list of columns according to filter controls. In some cases, the automatic query system includes options for further selecting value filters in the UI, which allow the user to build a query that returns rows with values, for certain columns, that match specified values. The automatic query system can collect the query selections (selected tables, columns, and value filters) to build and execute a join query.

Additional details on collecting query selections are provided below in relation to FIG. 5A.

In some implementations, the automatic query system can receive the user query selections and determine the number of connections (e.g., common columns) for each selected table. The automatic query system can select the table with the highest number of connections as the root table to join the selected tables into. In some cases, the automatic query system can resolve code snippets, from the programming objects corresponding to selected tables and columns, into search string snippets and can resolve the value filters into additional search string snippets. The automatic query system can then generate a join query for the root table by inserting the search string snippets into a query template. The automatic query system can execute the join query, joining all the tables into the root table, selecting data for indicated columns, and filtering on value filters. After executing the join query, the automatic query system can provide the results to the user. Additional details on executing a join query are provided below in relation to FIG. 5B.

Methods and systems disclosed herein can provide technical advantages over conventional data queries. Various embodiments employ the technical means of building a join query, retrieving join query selections from a UI, and executing the join query. For example, the automatic query system can provide one or more of the following technological improvements: 1) improved database access by providing a UI for selecting data sets; 2) faster query creation through mapping of selected data sets to pre-defined database queries; and 3) more reliable and consistent database use. Some existing systems can execute a data query that joins tables, but they require user knowledge of table and column names and the structure of the databases to determine how tables can be joined. The automatic query system and processes described herein provide a dynamic UI for table selections, column selections, and value filter selections, allowing execution of a query without a requiring the user to have a detailed knowledge of the data sources (e.g., labeling, storage location, etc.).

Several implementations are discussed below in more detail in reference to the figures. FIG. 1 is a block diagram illustrating an overview of devices on which some implementations of the disclosed technology can operate. The devices can comprise hardware components of a device 100 that execute customized queries created from user selections, of query elements, that are based on meta-data from data set registrations. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, automatic query system 164, and other application programs 166. Memory 150 can also include data memory 170, e.g., table data, column data, value filter data, user interface data, database element data, selection data, root table data, code snippet data, join query data, query template data, connection data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
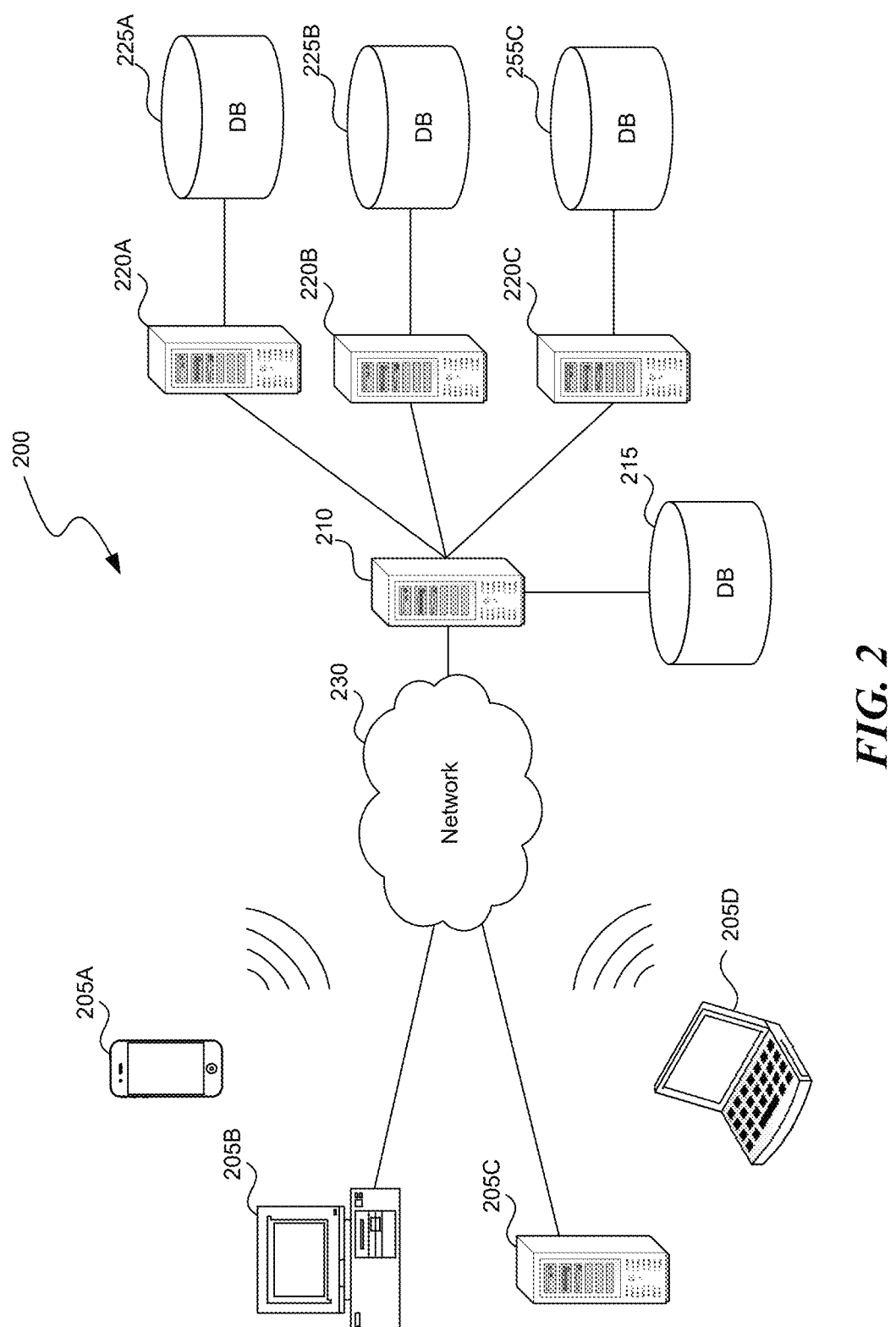
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as table data, column data, value filter data, user interface data, database element data, selection data, root table data, code snippet data, join query data, query template data, connection data. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
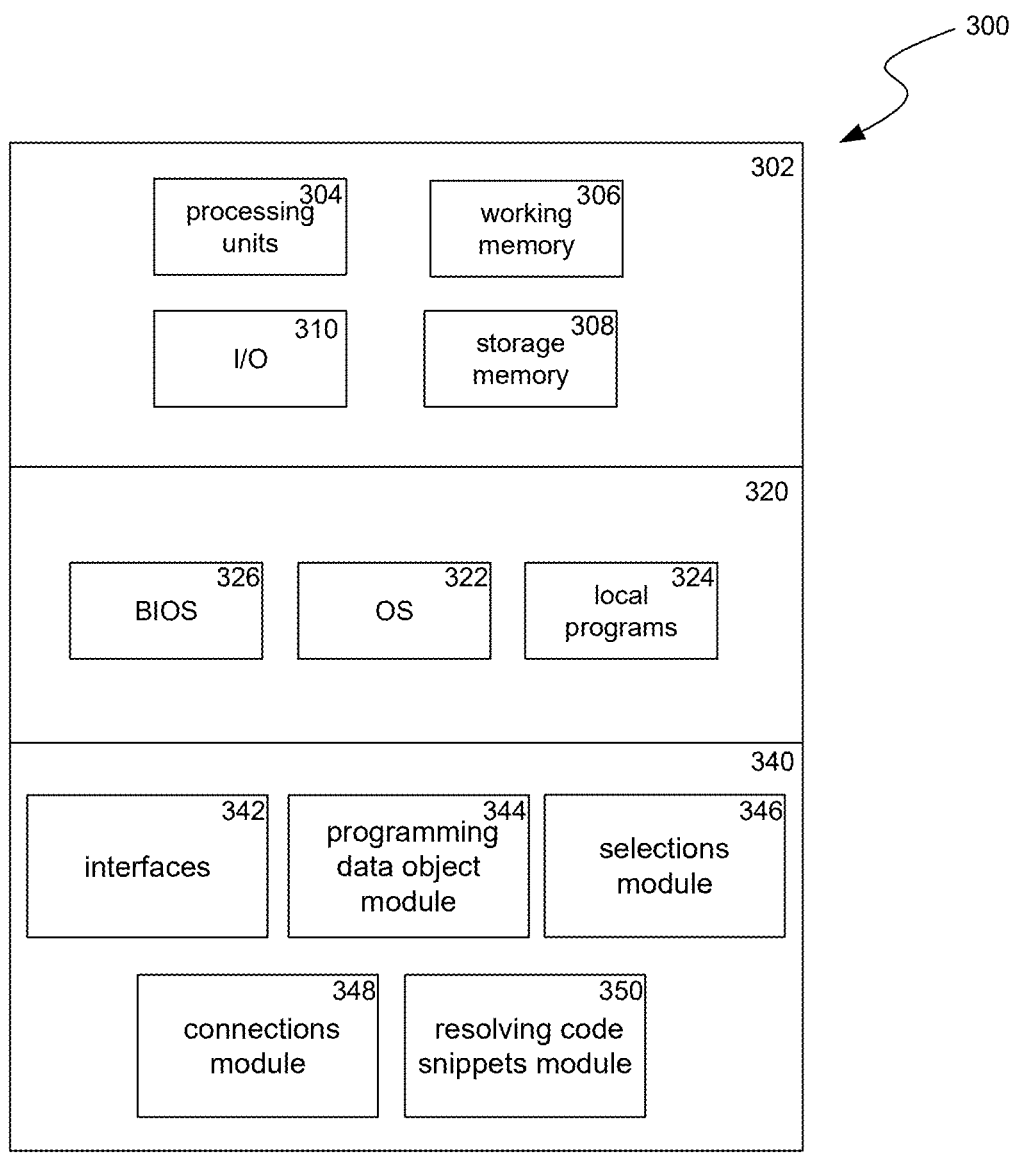
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g., CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g., a redundant array of independent disks (RAID)) accessible through a system bus or can be a cloud storage provider or other network storage accessible via one or more communications networks (e.g., a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include programming data object module 344, selections module 346, connections module 348, and resolving code snippets module 350, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

In some implementations, the programming data object module 344 is configured to register programming data objects, received from a user, corresponding to one or more database elements. The programming data objects can define the database elements for a table or columns within a table. Each of the programming data objects can have corresponding meta-data defining what is displayed in a user interface (UI) for table selections or column selections by a user. Additional details on registering programming data objects are provided below in relation to blocks 402 and 404 of FIG. 4.

In some implementations, the selections module 346 is configured to provide a UI with selectable table, column, and value filter elements, based on the programming data objects registered through programming data object module 344. The selections module 346 can then receive, from the UI, table, column, and/or value filter selections by the user. As the user provides the table selections, the UI can filter the list of selectable tables so that the additional tables, that are available for user selection, can be joined (e.g., having at least one column label in common) to the previously selected tables. Additional details on table, column, and value filter selections are provided below in relation to blocks 504, 506, 508, 510, 512, 514, 516, and 518 of FIG. 5A.

In some implementations, the connections module 348 is configured to compute a number of connections (e.g., number of columns the selected tables have in common) between each of the selected tables. Connections module 348 can determine the table with the highest number of connections and select that table as a root table. Additional details on connections are provided below in relation to blocks 554 and 556 of FIG. 5B.

In some implementations, the resolving code snippets module 350 is configured to resolve code snippets, from the programming objects corresponding to selected tables and columns, into search string snippets. The resolving code snippets module 350 can resolve the value filters into additional search string snippets. A join query can be generated for the root table, by the resolving code snippets module 350 inserting the search string snippets into a query template. This query can then be passed to a database gateway to execute and return results. Additional details on resolving code snippets and creating and executing a query are provided below in relation to blocks 558-564 of FIG. 5B.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
FIG. 4 is a flow diagram illustrating a process used in some implementations for registering database elements with meta-data.
Figure 4:
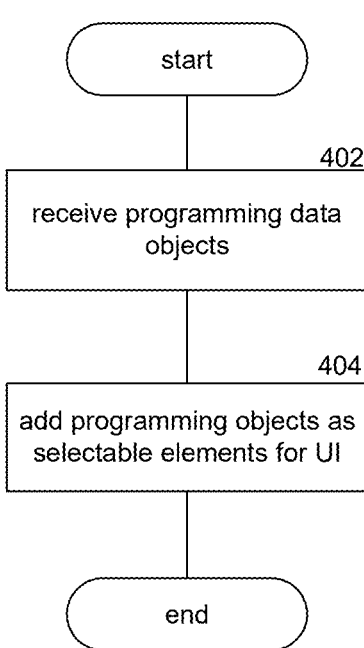

FIG. 4 is a flow diagram illustrating a process 400 used in some implementations for registering database elements with meta-data. In some implementations, process 400 can be initiated by a user accessing an interface to register new data tables/columns, (e.g., a server can receive a request for a user interface (UI) for registering a database element and that UI can be used to provide the programming objects discussed below). Thus, process 400 can be a server-side process for a system that registers database elements for queries.

At block 402, process 400 can receive programming data objects, corresponding to database elements, with meta-data. Each of the programming data objects can define a database element for a table and/or column within the table in a database. The programming data objects can specify a string (e.g., table name, column name, or portion of a search query), or a code snippet that can be resolved into such a string when parameters are applied. Resolving the snippet can include executing the code snippet with run-time parameters. The programming data objects can specify the relationships between multiple columns that overlap (e.g., have equivalent or similar uses, with one to many, many to one, one to one relationships) among columns of one or more tables. When a programming data object is resolved to a string, process 400 can select, from among these columns based on these relationships, a first column with a non-null value. As discussed below in relation to FIG. 5B, when a database element is selected, the string from the corresponding programming data object can be resolved and put (e.g., concatenated) into a query template.

Each of the one or more database elements can have corresponding meta-data. In some cases, the meta-data can define what is displayed in the UI for the table selections or the column selections made by a user. For example, the meta-data for a column can define what shows up in a column list (see e.g., list 632 in FIG. 6B), such as a column label, or the metadata can have tags attached to it. In some cases, the meta-data can also define how the tables or columns can be searched or filtered. For example, the meta-data can include a name that shows up in a selection list, a description of that element, tags/topics to match to search/filter controls. Process 400 can present the meta-data in the UI so a user (e.g., system administrator, analyst, etc.) can select query elements based on the meta-data. In some implementations, the meta-data can also define additional user resources for a table or column, e.g., providing a description of the uses of that table or column, typical queries that the table or column may be used for, helpful references, etc. Such user resources can be surfaced in the UI, allowing an analyst to better understand which table and columns they should select for a particular intended result set.

At block 404, process 400 can register the programming data objects corresponding to the database elements received at block 402, by adding the programming objects as selectable elements (values) for the UI. In some implementations, process 400, when registering a table, can determine the overlap between that table and other registered tables (e.g., columns that have common IDs, labels, or other unique identifying information). In some implementations, determining column overlap can include comparing the data between rows known to match (e.g., with a matching GID or key) and identifying cells that have matching values. When a threshold such matches occur between two columns, the columns can be identified as overlapping. As process 400 adds tables as selectable elements, the list of available tables that overlap (can be joined) with other tables can expand as tables are selected. For example, every table that has columns in common can be linked to other tables that have columns in common, potentially resulting in a graph of table nodes with edges specifying linking columns. Process 400 can add columns as selectable elements in the UI. The UI can be configured to allow selection of columns where the corresponding table has been selected. As discussed below, the UI can also add value filters as selectable elements in the UI, e.g., based on the added columns. By adding the value filters, the UI can allow the user to build a query that returns rows with values, for certain columns, that match user-specified values.

Figure 5A:
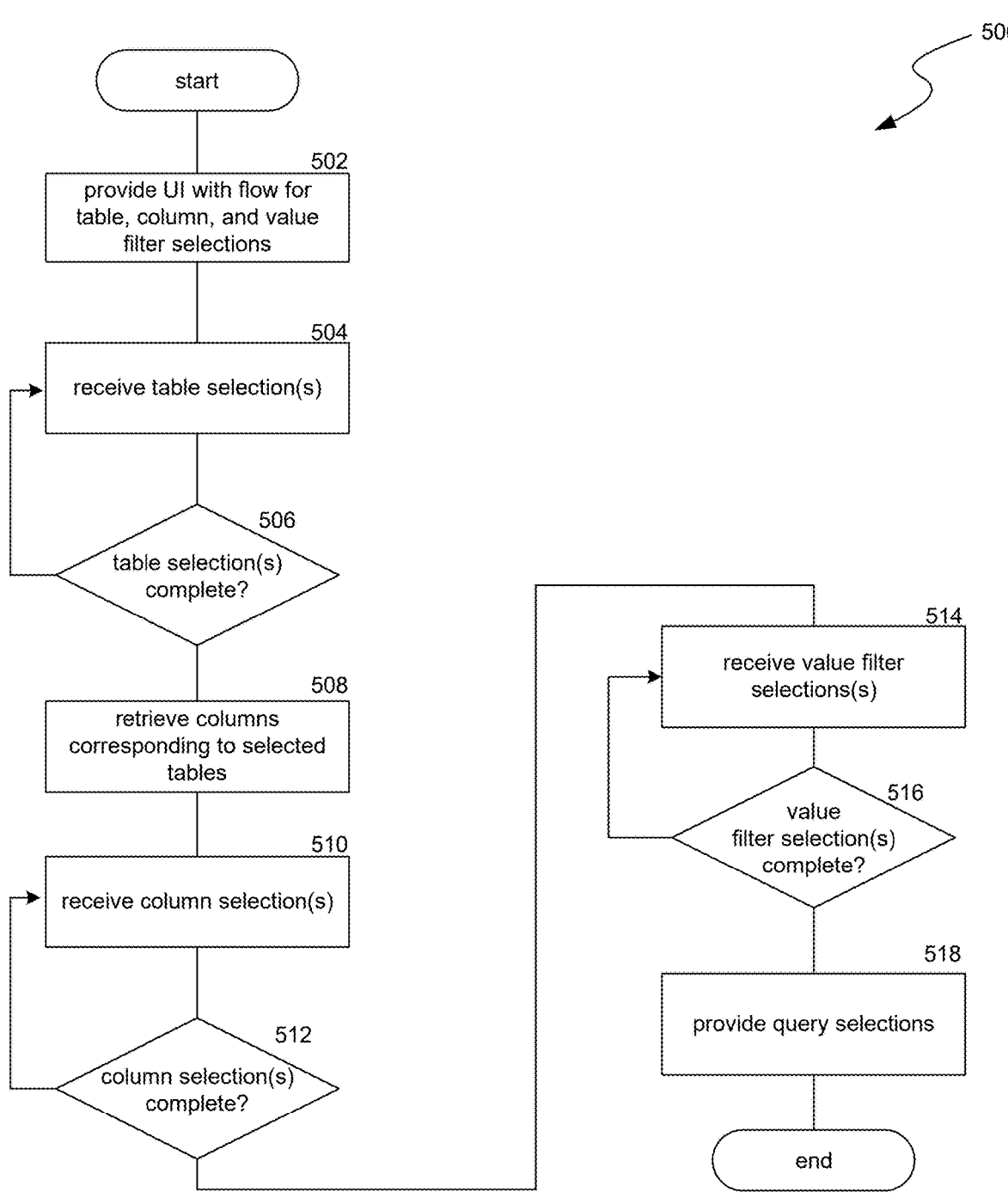
FIG. 5A is a flow diagram illustrating a process used in some implementations for receiving table, column, and value filter query selections for a query.

FIG. 5A is a flow diagram illustrating a process 500 used in some implementations for receiving table, column, and value filter query selections for a query. In some implementations, process 500 can be initiated by a user accessing an interface to build a query, a request for a user interface (UI) for selecting data sets, or a user accessing a database. In various implementations, process 500 can be a server-side process or a client-side process for a system that automatically builds queries. In some cases, parts of process 500 can be performed on a server while other parts are performed on a client.

At block 502, process 500 can provide the user interface (UI) with a flow for table selections, column selections, and value filter selections. The UI can be based on the registered programming data objects corresponding to one or more database elements. The items in each table/column list can be based on the meta-data, from the programming data object, defining that element (from block 402 of FIG. 4). In some implementations, the UI can have pre-defined templates for auto-selection of some or all of the value filters. In some cases, process 500 can allow a user to build a query and save it as a template for that user or other users to access later.

Figure 6A:
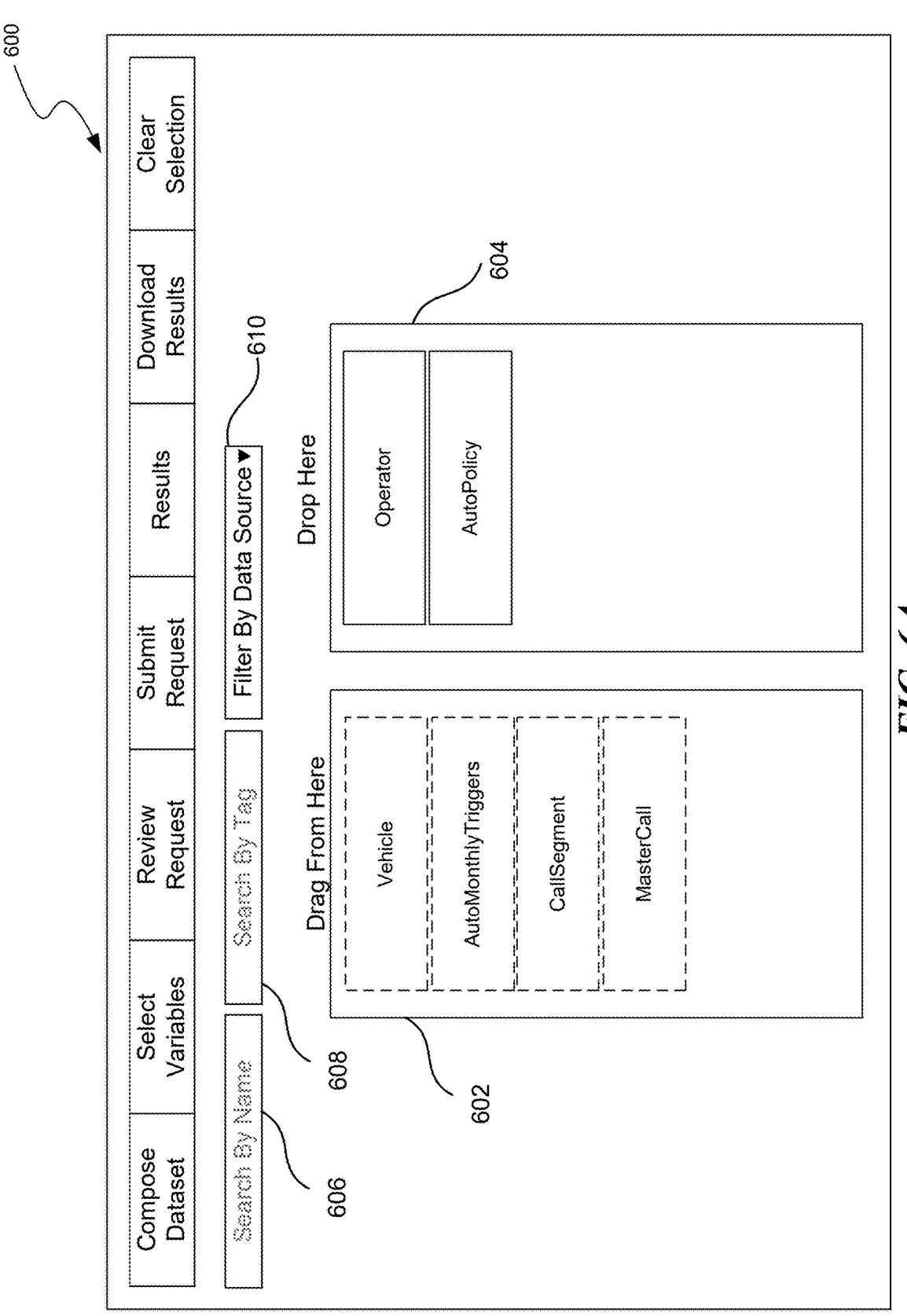
FIG. 6A is a conceptual diagram illustrating an example of a UI for selecting tables of data for a query.

At block 504, process 500 can receive, from the UI, table selection(s). FIG. 6A illustrates example 600 of a UI for selecting tables of data for a query. In example 600, a user has selected (shown in the Drop Here box 604) an Operator table and an AutoPolicy table from the list which still contains Vehicle, AutoMonthlyTriggers, CallSegment, and MasterCall tables (shown in the Drag From Here box 602). The user can search by the table name (e.g., using name search control 606), a tag of the table (e.g., using tag search control 608), or filter by data source or data element (e.g., using source search control 610).

As the user makes table selections in the UI, process 500 can (or the UI provided by process 500 can be configured to) filter the list of selectable tables so that the additional tables that are available for user selection (e.g., in list 602) are tables that can be joined to the previously selected tables. For example, the available tables can be filtered based on each available table having at least one column in common with at least one of the previously selected tables (e.g., in list 604). In some implementations, process 500 can also filter the list of selectable tables according to search/filter controls. For example, a user entering a name "Auto" in tag search control 608 may cause list 602 to filter out tables that do not have a tag, in the corresponding meta-data registered for that table, unrelated to automobiles.

At block 506, process 500 can determine whether the user has completed selecting tables. Process 500 can return to block 502 until the user indicates (e.g., with a user command, pressing a button, etc.) the table selection is complete. Process 500 can continue to block 508 when the user indicates the table selection is complete. As discussed below in relation to block 558 of FIG. 5B, the tables selected via blocks 504 and 506 can be resolved into strings for corresponding tables to be entered in a query template.

At block 508, process 500 can retrieve the columns corresponding to the selected tables. Process 500 can retrieve a list of the columns, as defined by the programming objects, that are in the tables selected by the user.

Figure 6B:
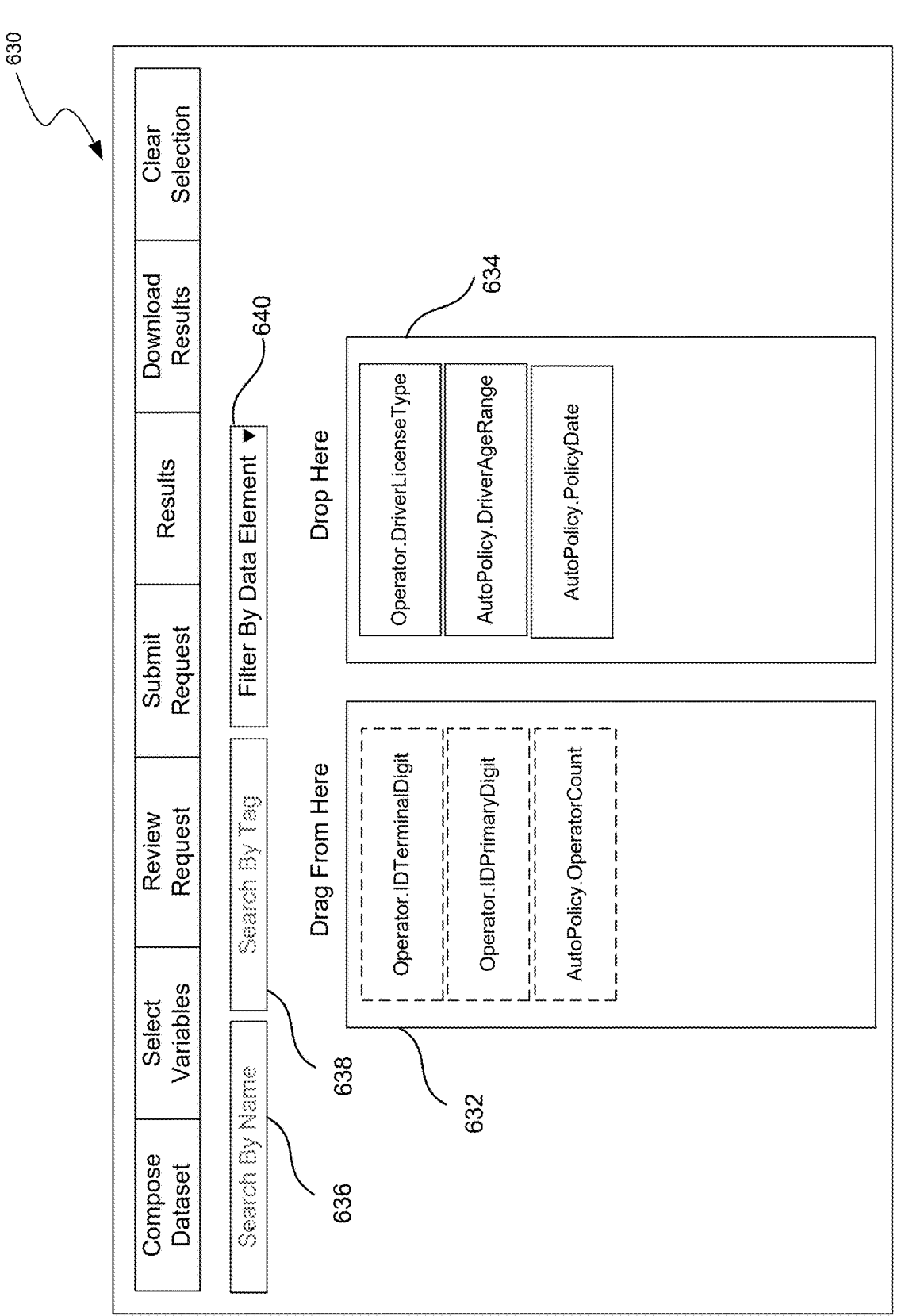
FIG. 6B is a conceptual diagram illustrating an example of a UI for selecting columns of data for a query.

At block 510, process 500 can receive, from the UI, column selection(s) of the retrieved columns. Process 500 can filter the list of columns according to filter/search controls. FIG. 6B illustrates example 630 of a UI for selecting columns of the retrieved columns corresponding to the selected Operator and AutoPolicy tables (selected by the user in FIG. 6A). In example 630, a user has selected (shown in the Drop Here box 634) an Operator.DriverLicenceType column, an AutoPolicy.DriverAgeRange column, and an AutoPolicy.PolicyDate column from list the column which still contains Operator.IDTerminalDigit, Operator.IDPrimaryDigit, AutoPolicy.OperatorCount, and columns (shown in the Drag From Here box 632). The user can also use controls 636-640 to search column names (control 636), search the tags assigned to columns in the corresponding meta-data (control 638), and filter by particular data element types (control 640).

At block 512, process 500 can determine whether the user has completed selecting columns. Process 500 can return to block 510 until the user indicates (e.g., with a user command, pressing a button, etc.) the column selection is complete. Process 500 can continue to block 514 when the user indicates the column selection is complete. As discussed below in relation to block 558 of FIG. 5B, the columns selected via blocks 510 and 512 can be resolved into strings for corresponding columns to be entered in a query template.

Figure 6C:
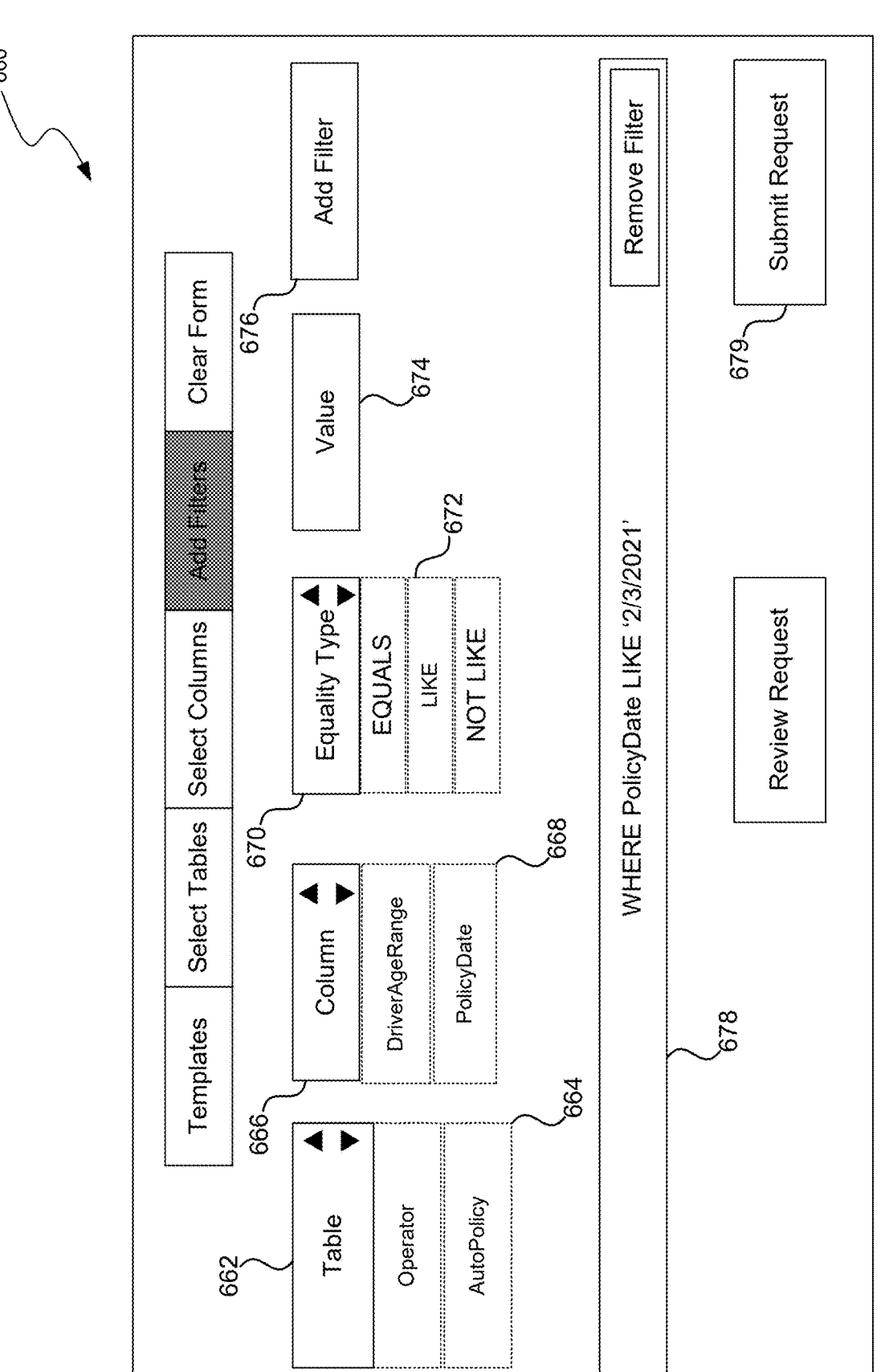
FIG. 6C is a conceptual diagram illustrating an example of a UI for selecting value filters for a query.

At block 514, process 500 can receive, from the UI, value filter selections. The value filter selections can allow the user to build a query that returns rows with values, for certain columns, that match specified values (e.g., setting "WHERE" parameters in a SQL query). The user can select any column from the set of selected tables (tables selected at block 504) and specify values to match results on. FIG. 6C illustrates example 660 of a UI for selecting value filters. For example, as illustrated, a user can build a query by selecting one of the tables identified at block 504 (using dropdown 662), selecting a column from that table (using dropdown 666), selecting a comparison type (using dropdown 670), and entering a comparison value in text field (674). In example 660, the user has selected the AutoPolicy table 664, the PolicyDate column 668, the "LIKE" comparison type 672, has entered value "2/3/2021," then pressed the "Add Filter" button 676 to create value filter 678, which creates the WHERE clause "WHERE PolicyDate LIKE '2/3/ 2021.'"

At block 516, process 500 can determine whether the user has completed selecting value filters. Process 500 can return to block 514 until the user indicates (e.g., with a user command, pressing a button-such as button 679, etc.) the value filter selection is complete. Process 500 can continue to block 518 when the user indicates the value filter selection is complete.

At block 518, process 500 can collect the query selections (selected tables, columns, and value filters). Process 500 can provide the programming objects, corresponding to selected tables, columns, and value filters, to the automatic query system to build and execute a query (using process 550 below).

Figure 5B:
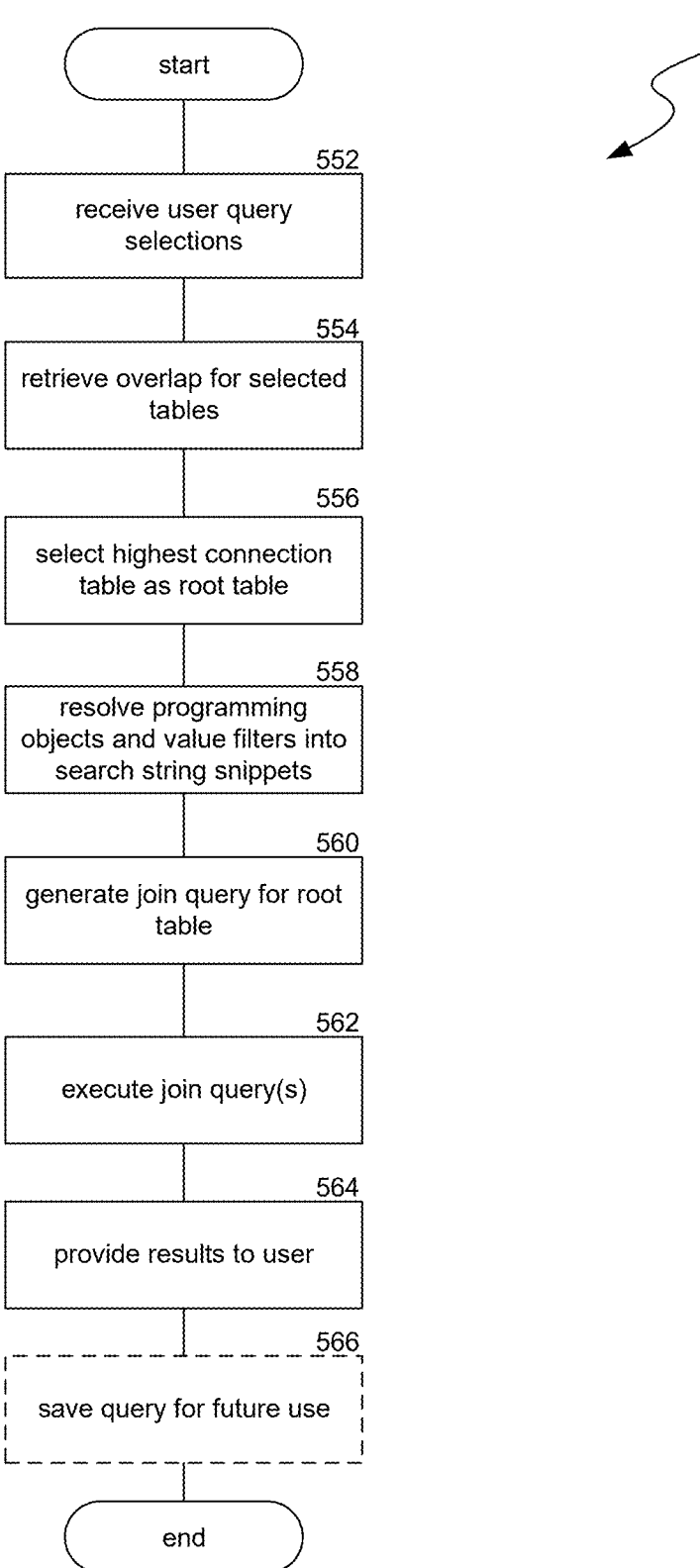
FIG. 5B is a flow diagram illustrating a process used in some implementations for executing a join query based on query selections.

FIG. 5B is a flow diagram illustrating a process 550 used in some implementations for executing a join query based on query selections. In some implementations, process 550 can be initiated by receiving the query selections (selected tables, columns, and value filters) from a user interface (UI), receiving a request to execute a query, or a user building a query. Process 550 can be a server-side process for a system that automatically builds and executes queries based on user selections (e.g., selections received from the process described in FIG. 5A).

At block 552, process 550 can receive the user query selections (provided from block 518 of FIG. 5A). At block 554, process 550 can retrieve the overlap (e.g., columns that have common labels or information) of columns for selected tables. Process 550 can determine the number of connections (e.g., number of columns the selected tables have in common) for each selected table. In some implementations, determining column overlap can include comparing the data between rows known to match (e.g., with a matching GID or key) and identifying cells that have matching values. When a threshold such matches occur between two columns, the columns can be identified as overlapping. In some implementations, process 550 can organize the columns in the retrieved tables by determining column labels that two or more tables have in common. For example, the column label can be the connection (common factor) between two or more tables. Process 550 can determine the table with the highest number of connections with other selected tables based on the determined connection counts between the tables. In some cases, process 550 can sort the selected tables by overlap amounts. At block 556, process 550 can select the table with the highest number of connections as the root table, allowing process 550 to build a query that joins the other selected tables into the root table.

At block 558, process 550 can resolve code snippets, from the programming objects corresponding to selected tables, selected columns, and root table, into search string snippets. In some cases, a programming object can simply define a search string snippet, such as a table name or column name, to be used when resolving the programming object. In other cases, a programming object can specify a code snippet which, when evaluated applying additional query parameters, returns a string. For example, a programming object can have a code snippet that specifies a list of multiple columns of one or more tables, and provides a string that, for a given row, selects the first column name where the value in that column, for that row, is non-null. In some cases, process 550 can also resolve the value filters into additional search string snippets. Process 550 can create a value filter search string snippet by inserting user-selected column, comparator, and value, of the value filter, into a predefined string expression. For example, a filterString can be created by executing the instruction filterString="WHERE". <value filter column>. " ". <specified comparator>. " ". <value>; such that the . operator is a concatenation, <value filter column> is a variable filled with the selected column of the value filter, <specified comparator> is a variable filled with the selected comparator of the value filter, and <value> is the user-entered value of the value filter. As a more specific example, the value filter in FIG. 6C, where the selected column is "PolicyDate" the selected comparator is "LIKE" and the entered value is "2/3/2021," the search string snippet can be generated as "WHERE PolicyDate LIKE '2/3/ 2021.'"

At block 560, process 550 can generate a join query for the root table by inserting the search string snippets into a query template. The query template can have specified blanks corresponding to tables, columns, and value filters. The strings for these types (resolved at block 558) are inserted in the corresponding template slots. In an example, process 550 can insert, into a root table slot in the query template, the search string snippet for the root table; can insert, into a join table slot in the query template, one or more search string snippets for the selected tables that are not the root table; can insert, into a column select slot in the query template, the one or more search string snippets for the one or more selected columns; and can insert, into a value filter select slot in the query template, one or more search string snippets for the one or more selected value filters. If tables are from different data sources, process 550 may create multiple join queries, one for each data source and can further join results of the individual queries together.

An SQL template example for the join query is:
SELECT <column_name(s)> FROM <root_table>
INNER    JOIN    <table2>    ON    <root_table>     .
    <column_name>=<table2>.
    <column_name>; // add a copy of this line for each
        joined table
    <value filters> // add each value filter search string snippet
        with a "AND" connector
where the <column_name(s)> is replaced with a comma separated list of the column search string snippets (which may be expressed in terms of the table the column originates from); the <root_table> is replaced with the search string search string snippet for the root table; a copy of the line of "INNER    JOIN    <table2>    ON    <root_table>. <column_name>=<table2>.<column_name>" is added for each joined non-root table, where <table2> is the table being joined and the <column_name> is the column from that table that overlaps with an already joined in table (which may be the root table or another table); and the <value filters> is replaced with the value filter search string snippets, each separated by an "AND" string.

At block 562, process 550 can execute the query (e.g., join query), e.g., by passing the filled in query template to a database handler, which can join all the tables into the root table, select data for indicated columns, and filter on the value filters. In some implementations, if there are multiple queries, process 550 can do additional joins for those queries.

Figure 6D:
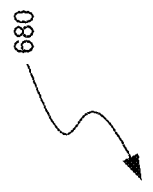
FIG. 6D is a conceptual diagram illustrating an example of query results.

At block 564, after executing the query, process 550 can provide the results to user. FIG. 6D illustrates example 680 of a UI displaying the results of a query. The results display the selected columns (from FIG. 6B) of Operator.DriversLicenceType, AutoPolicy.DriverAgeRange, and AutoPolicy-.PolicyDate. In some cases, process 550 can provide the results in the form of a downloadable file, such as a CSV file, with the results formatted in a user specified or predetermined way.

At block 566, process 550 can save the query for future use, allowing the user to save table, column, or value filter selections for future use. For example, a user can indicate that the query should be named an available in a query library which that user or other users may be able to access. While, as discussed above, no block in the described flows are required, block 566 is illustrated in dashed lines to call out specific instances where block 566 is not performed. In some cases, process 550 can put the query selections or results in a repository of searches that other users can access.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method comprising:

receiving, from a user interface, selections of two or more tables and one or more columns for a join query, wherein the user interface is based on programming data objects corresponding to one or more database elements;

selecting a first table of the two or more tables as a root table for the join query based on the first table having a highest number of connections between each of the two or more tables;

resolving code snippets, from the programming data objects corresponding to the two or more tables and the one or more columns, into search string snippets;

executing the join query to:

insert, into a root table slot in a query template, a search string snippet for the root table;

insert, into a join table slot in the query template, one or more search string snippets for one or more tables of the two or more tables that are not the root table; and insert into a column select slot in the query template, the one or more search string snippets for the one or more columns; and displaying one or more results of the execution of the join query.

2. The method of claim 1, further comprising:

adding the programming data objects as selectable elements for the user interface, wherein tables are added as selectable elements, and wherein the user interface is configured to show columns, as selectable elements, from corresponding selected tables.

3. The method of claim 1, further comprising:

receiving, from the user interface, one or more value filter selections for the join query; and generating the one or more value filter selections into search string snippets.

4. The method of claim 1, wherein generating the join query further comprises:

inserting, into a value filter selection slot in the query template, search string snippets for one or more value filter selections.

5. The method of claim 1, further comprising:

determining column labels that the two or more tables have in common; and selecting the first table of the two or more tables as the root table based on the first table having a highest number of column labels in common between each of the two or more tables.

6. The method of claim 1, further comprising:

filtering a list of selectable tables to present tables that can be joined with previously selected tables.

7. The method of claim 1, further comprising:

removing one or more tables from a list of selectable tables when the one or more tables have no connections with previously selected tables.

8. A system comprising:

one or more processors; and one or more memories storing instructions that, when executed by the one or more processors, cause the system to perform a process comprising:

receiving, from a user interface, selections of two or more tables and one or more columns for a join query, wherein the user interface is based on programming data objects corresponding to one or more database elements;

selecting a first table of the two or more tables as a root table for the join query based on the first table having a highest number of connections between each of the two or more tables;

resolving code snippets, from the programming data objects corresponding to the two or more tables and the one or more columns, into search string snippets;

executing the join query to:

insert, into a root table slot in a query template, a search string snippet for the root table;

insert, into a join table slot in the query template, one or more search string snippets for one or more tables of the two or more tables that are not the root table; and insert into a column select slot in the query template, the one or more search string snippets for the one or more columns; and displaying one or more results of the execution of the join query.

9. The system according to claim 8, wherein the process further comprises:

adding the programming data objects as selectable elements for the user interface, wherein tables are added as selectable elements, and wherein the user interface is configured to show columns, as selectable elements, from corresponding selected tables.

10. The system according to claim 8, wherein the process further comprises:

receiving, from the user interface, one or more value filter selections for the join query; and generating the one or more value filter selections into search string snippets.

11. The system according to claim 8, wherein generating the join query further comprises:

inserting, into a value filter selection slot in the query template, search string snippets for one or more value filter selections.

12. The system according to claim 8, wherein the process further comprises:

determining column labels that the two or more tables have in common; and selecting the first table of the two or more tables as the root table based on the first table having a highest number of column labels in common between each of the two or more tables.

13. The system according to claim 8, wherein the process further comprises:

filtering a list of selectable tables to present tables that can be joined with previously selected tables.

14. The system according to claim 8, wherein the process further comprises:

removing one or more tables from a list of selectable tables when the one or more tables have no connections with previously selected tables.

15. A non-transitory computer-readable medium storing instructions that, when executed by a computing system, cause the computing system to perform operations comprising:

receiving, from a user interface, selections of two or more tables and one or more columns for a join query, wherein the user interface is based on programming data objects corresponding to one or more database elements;

selecting a first table of the two or more tables as a root table for the join query based on the first table having a highest number of connections between each of the two or more tables;

resolving code snippets, from the programming data objects corresponding to the two or more tables and the one or more columns, into search string snippets;

executing the join query to:

insert, into a root table slot in a query template, a search string snippet for the root table;

insert, into a join table slot in the query template, one or more search string snippets for one or more tables of the two or more tables that are not the root table; and insert into a column select slot in the query template, the one or more search string snippets for the one or more columns; and displaying one or more results of the execution of the join query.

16. The non-transitory computer-readable medium of claim 15, wherein the operations further comprise:

adding the programming data objects as selectable elements for the user interface, wherein tables are added as selectable elements, and wherein the user interface is configured to show columns, as selectable elements, from corresponding selected tables.

17. The non-transitory computer-readable medium of claim 15, wherein the operations further comprise:

receiving, from the user interface, one or more value filter selections for the join query; and generating the one or more value filter selections into search string snippets.

18. The non-transitory computer-readable medium of claim 15, wherein generating the join query further comprises:

inserting, into a value filter selection slot in the query template, search string snippets for one or more value filter selections.

19. The non-transitory computer-readable medium of claim 15, wherein the operations further comprise:

determining column labels that the two or more tables have in common; and selecting the first table of the two or more tables as the root table based on the first table having a highest number of column labels in common between each of the two or more tables.

20. The non-transitory computer-readable medium of claim 15, wherein the operations further comprise:

filtering a list of selectable tables to present tables that can be joined with previously selected tables.

\* \* \* \* \*